Oct. 29, 1963 MANABU KASHIHARA 3,108,496
INFINITELY VARIABLE SPEED CHANGE GEAR
Filed Jan. 30, 1961 3 Sheets-Sheet 3

INVENTOR.

BY

United States Patent Office 3,108,496
Patented Oct. 29, 1963

3,108,496
INFINITELY VARIABLE SPEED CHANGE GEAR
Manabu Kashihara, 12 Karahashi-Hanazono-cho,
Minami-ku, Kyoto, Japan
Filed Jan. 30, 1961, Ser. No. 85,688
3 Claims. (Cl. 74—796)

This invention relates to improvements in infinitely variable speed change gears using a plurality of double cone wheels.

In this specification, I define a term "double cone wheel" as a cone wheel having two cone surfaces arranged coaxially and being positioned with the apexes of the cone surfaces in opposite sides, a term "bottom cone surface" as the one cone surface of the double cone wheel arranged in the supporting side, and a term "top cone surface" as the other cone surface of the double cone wheel.

Heretofore, various types of infinitely variable speed change gears utilizing double cone wheels are known. But so far as I know they are accompanied with difficulties in relatively big operating force, in complex construction, in hard adjustment, or in undesirable pressure contact conditions between the double cone wheel and their engaging members.

The main object of my invention is to provide infinitely variable speed change gears that are operated smoothly by quite a small force and useful in various fields of automatic control.

The other object of my invention is to provide infinitely variable speed change gears having a high durability and having a relatively simple construction.

According to my invention there is provided an infinitely variable speed change gear, comprising a driving shaft and a driven shaft arranged coaxially, a cone wheel arranged coaxially with and driven by the driving shaft, a plurality of double cone wheels, the top cone surface of each double cone wheel being so arranged as to contact internally to an imaginary common cylindrical surface which has the same axis with the driving shaft, the bottom cone surface of each double cone wheel being engaged to the cone wheel driven by the driving shaft, a stationary ring engaging at a point to the top cone surface of each double cone wheel, operating means to shift the ring along the top cone surface of each double cone wheel and a common member supporting the shafts of the double cone wheels rotatably and being arranged to rotate about the axial line of the driven shaft, the double cone wheels, the cone wheel driven by the driving shaft and the common member supporting the shafts of the double cone wheels being constrained to transmit power from the driving shaft to the driven shaft by the stationary ring.

The ring above mentioned in the infinitely variable speed change gear according to my invention can be shifted by quite a small force. The reason why the ring is shifted smoothly is in that the forces acting on the ring, owing to the pressure contact between the ring and the double cone wheels, have radial direction components and no axial direction components.

My invention will be apparent from the following description taken with the accompanying drawings in which.

Figure 1:
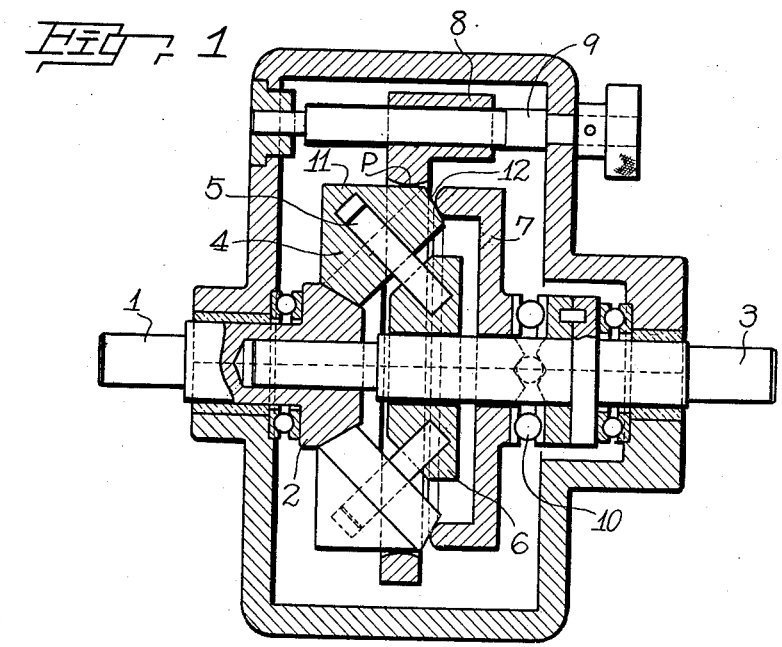
FIG. 1 is a longitudinal section view of an infinitely variable speed change gear according to the present invention.

In FIG. 1, 1 is a driving shaft and 2 is a cone wheel. The driving shaft 1 and the cone wheel 2 are formed in one block. 3 is a driven shaft, and 4 are double cone wheels. Each double cone wheel 4 is supported by a shaft 5 fixed on a common supporting member 6 to rotate freely.

Double cone wheel 4 has a top cone surface 11 and bottom cone surface 12. The top cone surface 11 of each double cone wheel is arranged to contact an imaginary cylindrical surface and the bottom cone surface 12 of each double cone wheel is arranged to converge to the axial line of the driving shaft 1 and the driven shaft 3.

The bottom cone surface of each double cone wheel engages to the cone wheel 2 on the driving shaft and also engages to a rim wheel 7. The surface of the cone wheel driven by the driving shaft may be made as a slightly convex surface.

Generally speaking, the power transmitting members contacting at a point do not contact at a geometrical point but contact at a finite area. And the pressure contact condition is severe as far as the pressure contact point is situated remotely from the rotating axis. In the case of the pressure contact condition between the cone wheel 2 and the double cone wheel 4, as the distance between the axis of rotation and the pressure contact point is relatively small, the pressure contact condition is relieved even though they contact with mutually arranging their centers of curvature on the opposite sides.

The rim wheel 7 is arranged concentrically on the driven shaft 3, and between the rim wheel and the driven shaft 3 is inserted a "ball and cam engaging device" 10. When the rim wheel 7 rotates, the balls in the device 10 advance between the two cam surfaces, and then the rim wheel 7 is fixed to the driven shaft 3.

The top cone surface of each double cone wheel engages at a point on the circle line of the surface of the ring 8.

The ring 8 is arranged concentrically with the driving shaft 1 and the driven shaft 3, and is moved by a speed change operating rod 9.

The rod 9 is arranged parallel to the driving shaft 1 and the driven shaft 3, and related to the ring 8 by a nut and screw engagement. As the top cone surface 11 of the double cone wheel 4 is arranged to contact with an imaginary cylindrical surface, the ring 8, maintaining the pressure contact condition to the double cone wheel 4, can be moved axially.

The ring 8, of course, has a convex cross-sectional profile to contact with each double cone wheel at a point, but as the center of curvature of the ring and the center of curvature of the double cone wheel are positioned at the same side as in the case of balls and the ball bearing races, the contact condition between the ring and the double cone wheels is a desirable one.

Figure 5:
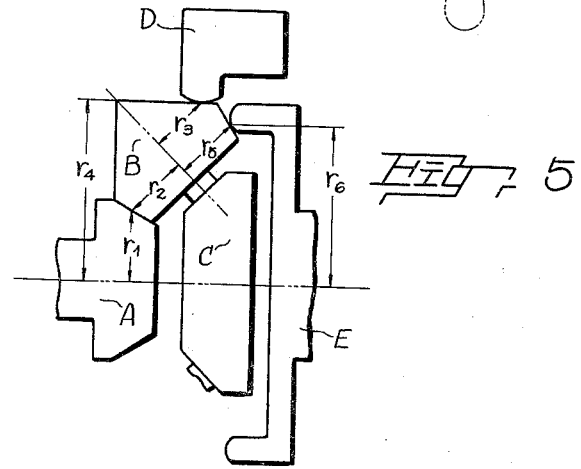
FIG. 5 is a skeleton view of the analysis of mechanism shown in FIG. 1.

When the driving shaft 1 rotates, the cone wheel 2 on the driving shaft 1 drives the double cone wheels 4. The motion of the double cone wheels 4 is a planetary one and the differential gear calculation proceeds referring to FIG. 5 as follows. In FIG. 5, the cone wheel 2, the double cone wheel 4, the supporting member 6, the ring 8 and the rim wheel 7 are represented as the members A, B, C, D, and E respectively. $r_1$—$r_6$ are the effective radii of rotation.

Assuming $$c_1 = \frac{r_2}{r_1}, \ C = \frac{r_3}{r_4}$$

I get the following Table I.

Table I

| Case | | Amount of rotation of the the members | | | |
|---|---|---|---|---|---|
| | | A | B | C | D |
| I | Members A, B, C, and D are mutually fixed and rotated. Amount of rotation is assumed $x$. | $x$ | $x$ | $x$ | $x$ |
| II | Member C is fixed and the member B is rotated. Amount of rotation of the member B is assumed $y$. | $-c_1 y$ | $y$ | 0 | $Cy$ |
| III | Compound motion of case I and case II. | $x-c_1 y$ | $x+y$ | $x$ | $x+Cy$ |

In real case the amount of rotation of the member D is equal to zero, and to deduce the amounts of rotation of the members B and C when the member A is rotated in an amount of N, the following equations are used.

$$x - c_1 y = N$$
$$x + Cy = 0$$

Accordingly, $x$ and $y$ are solved as follows:

$$X = \frac{C}{C + c_1} N$$

$$Y = \frac{-1}{C + c_1} N$$

Then the column III of the above table is written as follows.

Table II

| Case | Amount of rotation of the member | | | |
|---|---|---|---|---|
| | A | B | C | D |
| Real case | $N$ | $\frac{C-1}{C+c_1}N$ | $\frac{C}{C+c_1}N$ | 0 |

The member E in FIG. 5 or the rim wheel 7 in FIG. 1 is rotated by the planetary motion of the member B in FIG. 5 or the double cone wheel 4 in FIG. 1. Then the amount of rotation of the member E is calculated as follows.

Amount of rotation of the member $$E = f(r_3) = f(C) = c_2 x$$

(amount of rotation of the member B) + amount of rotation of the member $$C = c_2 \frac{C-1}{C+c_1} N + \frac{C}{C+c_1} N = \frac{(1+c_2)C - c_2}{C+c_1} N$$

Figure 2:
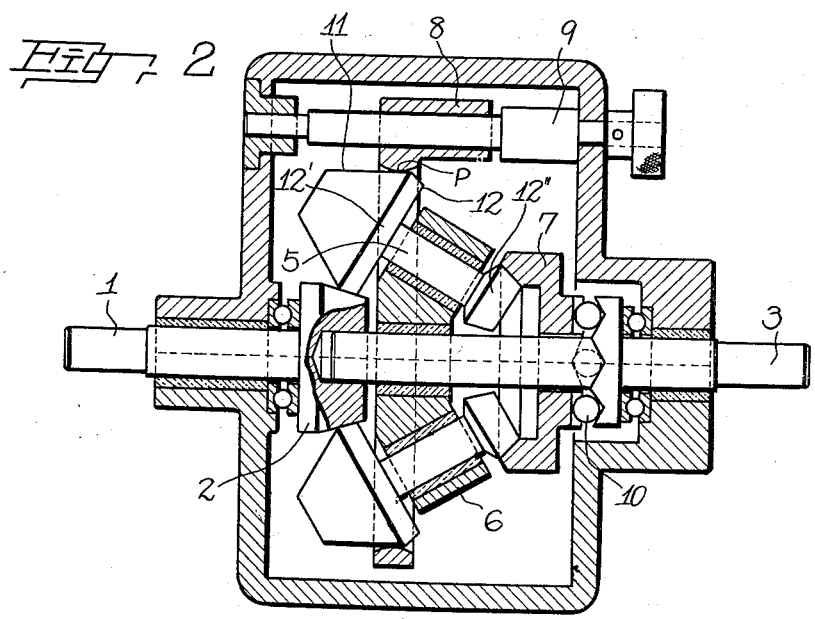
FIG. 2 is a similar view of the modification of the infinitely variable speed change gear shown in FIG. 1.

The infinitely variable speed change gear shown in FIG. 2 is a modification of the speed change gear shown in FIG. 1, and this speed change gear will be understood as a modified form in which the bottom cone surface 12 is divided into the cone surface 12' and 12".

In this form, the cone wheel giving the cone surface 12' and the cone wheel giving the cone surface 12" are fixed on the double cone wheel shafts. This form of speed change gear according to the present invention is made to select the constant $r_1 - r_6$ suitably according to the design factors.

Figure 3:
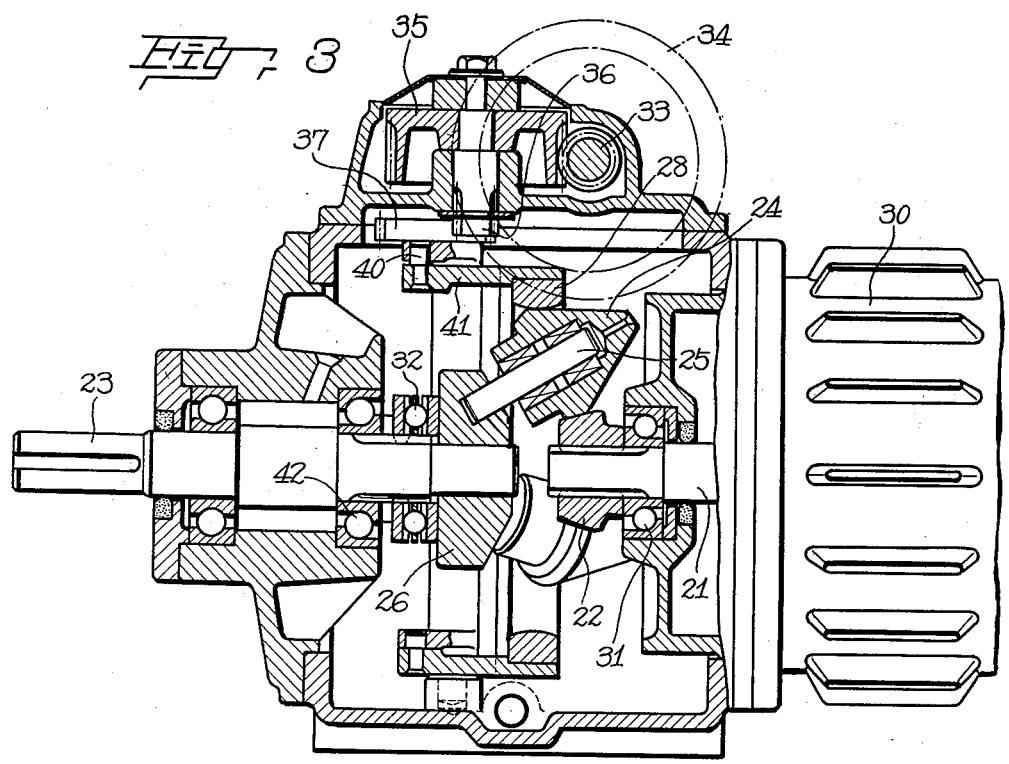
FIG. 3 is a longitudinal section view of another infinitely variable speed change gear according to the present invention.
Figure 4:
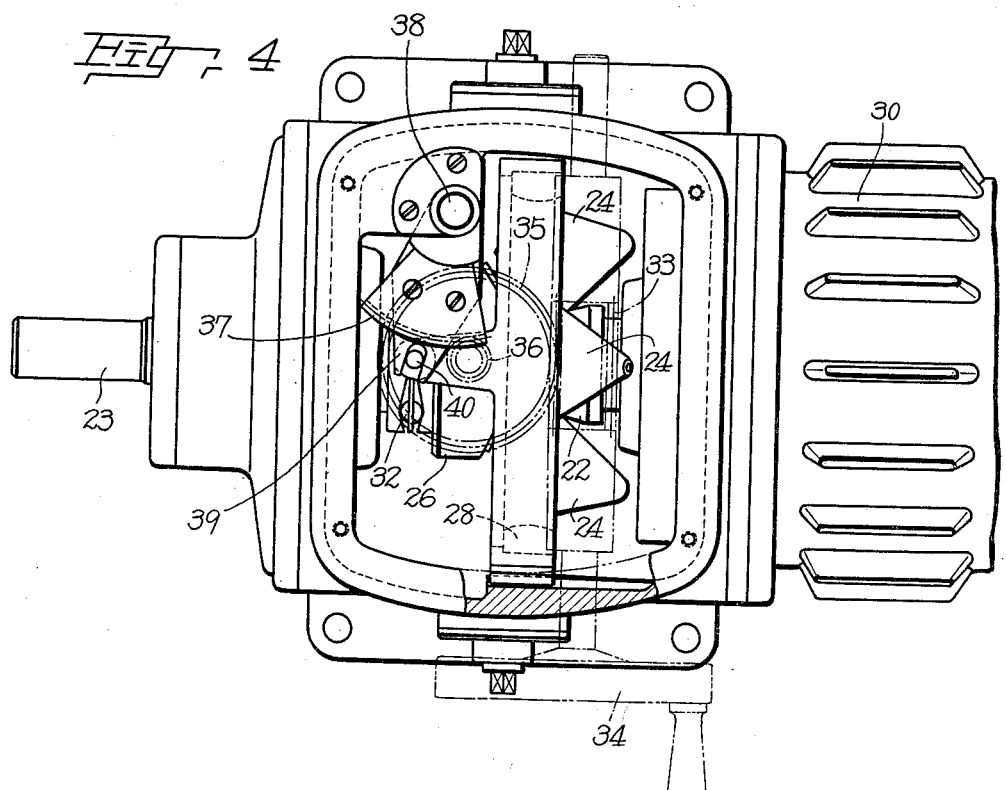
FIG. 4 is a plan view of the infinitely variable speed change gear of FIG. 3, and to show the structure of operating device, of which the top part is removed.

The infinitely variable speed change gear shown in FIG. 3 and FIG. 4 is one in which the power is taken out from the rotation of supporting member 6 of the speed change gear shown in FIG. 1.

In FIGS. 3 and 4, 21–26 are parts corresponding to the parts 1–6 in the infinitely variable speed change gear shown in FIG. 1. The driving shaft 21 is driven by an electric motor 30, and the end portion of the driving shaft 21 is splined to engage with a cone wheel 22. Axial force acting on the cone wheel 22 is stopped by a thrust bearing 31. In this embodiment of the present invention, the supporting member 26 of the double cone wheel shafts 25 is arranged to be fixed to the driven shaft 23 by a "ball and cam engaging device" 32. Double cone wheel shafts 25 are fixed in supporting member 26, and double cone wheels 24 rotate on 25 via bearings.

Accordingly, in this speed change gear the driven shaft 23 is rotated only by the rotation of double cone wheel shafts 25 about the axis of the cone wheel 22.

A ring 28 equivalent to the ring 8 in the speed change gear in FIG. 1 is arranged to be shifted axially by an operating device. This device contains a worm 33, a handle 34 to turn the worm shaft (see also FIG. 4), a worm wheel 35 meshed with the worm 33, a pinion 36 on the worm wheel shaft, a sector gear 37 pivoted by a shaft 38 (see FIG. 4) and meshed with the pinion 36, a fork 39 fixed on the sector gear 37 and a pin 40 on a supporting member 41 of the ring 28. Speed change operation is carried out by turning the handle 34 shifting the ring 28 axially. While axially shiftable, ring 28 does not rotate.

When the driving shaft 21 is rotated by the electric motor 30, the cone wheel 22 drives the double cone wheels 24. Then the double cone wheels 24 perform a planetary motion and the supporting member 26 of the double cone wheel shafts 25 rotates about the driven shaft 23. The "ball and cam engaging device" 32 fixes the supporting member 26 to the driven shaft 23 by the rotation of the supporting member and also produces a sufficient engaging pressure between the double cone wheels 24 and their engaging members 28, 22. Axial thrust force acting on the supporting member 26 and the driven shaft 23 is stopped by thrust bearing 42.

What I claim is:

1. An infinitely variable speed change gear comprising a driving shaft and a driven shaft arranged coaxially, a cone wheel arranged on and driven by the driving shaft, a plurality of double cone wheels, each rotatably supported on a shaft therefor, the top cone surface of each double cone wheel being so arranged as to contact internally an imaginary common cylindrical surface which has the same axis as that of the driving shaft, the bottom cone surface of each double cone wheel engaging the cone wheel on the driving shaft, a stationary ring having point engagement with the top cone surface of each double cone wheel, operating means to shift the ring along the top cone surface of each double cone wheel, a common member supporting the shafts of the double cone wheels rotatably and being arranged to rotate about the axial line of the driven shaft, a rim wheel engaging the bottom cone surface of each double cone wheel and being mounted to rotate with the driven shaft and means to generate engaging pressure between the double cone wheels and their engaging parts said pressure generating means comprising a cam-and-ball device arranged at the rear of said rim wheel and between the latter and said driven shaft.

2. An infinitely variable speed change gear comprising a driving shaft and a driven shaft arranged coaxially, a main cone wheel arranged on and driven by the driving shaft, a plurality of double cone wheels, each rotatably supported on an end of a shaft therefor, the top cone surface of each double cone wheel being so arranged as to contact internally an imaginary common cylindrical surface which has the same axis as that of the driving shaft, the bottom cone surface of each double cone wheel engaging said main cone wheel on the driving shaft, a stationary ring having point engagement with the top cone surface of each double cone wheel, operating means to shift the ring along the top cone surface of each double cone wheel, a common member supporting the shafts of the double cone wheels rotatably and being arranged to rotate about the axial line of the driven shaft, a plurality of cone wheels equal in number to the number of said double cone wheels, these cone wheels being fixed on those ends of said double cone wheel shafts opposite to the ends on which said double cone wheels are supported, a rim wheel engaging the cone wheels fixed on the double cone wheel shafts and being mounted to rotate the driven shaft and means to generate engaging pressure between the double cone wheels and their engaging parts said pressure generating means comprising a cam-and-ball device arranged at the rear of said rim wheel and between the latter and said driven shaft.

3. An infinitely variable speed change gear, comprising a driving shaft and a driven shaft arranged coaxially, a cone wheel arranged coaxially with and driven by the driving shaft, a plurality of double cone wheels, each rotatably supported on a shaft therefor, the top cone surface of each double cone wheel being so arranged as to contact internally an imaginary common cylindrical surface which has the same axis as that of the driving shaft, the bottom cone surface of each double cone wheel engaging the cone wheel driven by the driving shaft, a stationary ring having point engagement with the top cone surface of each double cone wheel, operating means to shift the ring along the top cone surface of each double cone wheel, a common member supporting the shafts of the double cone wheels, rotatably, said common member being supported on and axially movable with respect to the inner end of the driven shaft and so arranged as to rotate with the driven shaft, and means to generate engaging pressure between the double cone wheels and the cone wheel and stationary ring in engagement therewith.

References Cited in the file of this patent

UNITED STATES PATENTS

| | | |
|---|---|---|
| 1,585,140 | Erban | May 18, 1926 |
| 2,836,994 | Weber | June 3, 1958 |

FOREIGN PATENTS

| | | |
|---|---|---|
| 464,646 | Canada | Apr. 25, 1950 |